US011804072B2

(12) United States Patent
Xue (10) Patent No.: US 11,804,072 B2
(45) Date of Patent: Oct. 31, 2023

(54) METHOD FOR TRAINING CONVOLUTIONAL NEURAL NETWORK, AND METHOD FOR FACE RECOGNITION AND DEVICE

(71) Applicant: BOE Technology Group Co., Ltd., Beijing (CN)

(72) Inventor: Ruibin Xue, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 196 days.

(21) Appl. No.: 17/351,958

(22) Filed: Jun. 18, 2021

(65) Prior Publication Data

US 2022/0129665 A1    Apr. 28, 2022

(30) Foreign Application Priority Data

Oct. 26, 2020   (CN) .......................... 202011158201.6

(51) Int. Cl.
*G06V 40/16*    (2022.01)
*G06N 3/08*    (2023.01)
(Continued)

(52) U.S. Cl.
CPC .......... *G06V 40/172* (2022.01); *G06F 18/214* (2023.01); *G06N 3/08* (2013.01); *G06T 7/74* (2017.01); *G06V 40/165* (2022.01); *G06V 40/171* (2022.01); *G06T 2207/20081* (2013.01); *G06T 2207/20084* (2013.01); *G06T 2207/20132* (2013.01)

(58) Field of Classification Search
CPC ........ G06F 18/214; G06N 3/045; G06N 3/08; G06V 10/454; G06V 10/82; G06V 40/165; G06V 40/171; G06V 40/172
See application file for complete search history.

(56) References Cited

U.S. PATENT DOCUMENTS

2020/0082157 A1 *   3/2020   Susskind ................ G06V 40/18

FOREIGN PATENT DOCUMENTS

| CN | 110909595 | * | 3/2020 |
| CN | 111814603 | * | 10/2020 |

OTHER PUBLICATIONS

A machine translated English version of CN110909595, Mar. 24, 2020 (Year: 2020).*

(Continued)

*Primary Examiner* — Ruiping Li
(74) *Attorney, Agent, or Firm* — IPRO, PLLC (57) ABSTRACT

The present disclosure provides a method for training a convolutional neural network and a method and device for face recognition. By arranging a first training sample set including a first data set and a second data set, the convolutional neural network is trained and may be applied to the face recognition method, an initial face image frame may be extracted from a face detection image, in the face recognition method, a portion above eyes is cropped from the initial face image frame to serve as a target face detection image, thus according to the target face detection image, predicted identity information corresponding to the target face detection image is determined, and then the target face detection image is compared with a face reference image corresponding to the predicted identity information for face recognition.

14 Claims, 5 Drawing Sheets

(51) Int. Cl.
   *G06T 7/73*     (2017.01)
   *G06F 18/214*   (2023.01)

(56) References Cited

OTHER PUBLICATIONS

A machine translated English version of CN111814603, Oct. 23, 2020 (Year: 2020).*
Li et al, "Look Through Masks: Towards Masked Face Recognition with De-Occlusion Distillation", Oct. 16, 2020 (Year: 2020).*
Mundial et al, "Towards Facial Recognition Problem in COVID-19 Pandemic", Aug. 2020. (Year: 2020).*

* cited by examiner

METHOD FOR TRAINING CONVOLUTIONAL NEURAL NETWORK, AND METHOD FOR FACE RECOGNITION AND DEVICE

CROSS-REFERENCE TO RELATED APPLICATION

This application is based on and claims priority under 35 U.S.C. 119 to Chinese Patent Application No. 202011158201.6, filed on Oct. 26, 2020, in the China National Intellectual Property Administration. The entire disclosure of the above application is incorporated herein by reference.

FIELD

The present disclosure relates to the technical field of face recognition, in particular to a method for training a convolutional neural network, and a method for face recognition and device.

BACKGROUND

Generally, in order to better recognize a face image, more and more recognition processes need a Convolutional Neural Network (CNN). In order to guarantee an accurate recognition result, the CNN needs to be trained repeatedly, so that a trained CNN may be used for face recognition.

SUMMARY

An embodiment of the present disclosure provides a method for training a convolutional neural network, including:

inputting a first training sample set into the convolutional neural network, extracting an initial face image frame in each face image sample in the first training sample set, and determining a first training loss value corresponding to the initial face image frame through a predetermined first loss function;

wherein the first training sample set includes a first data set and a second data set, the first data set includes a plurality of face image samples of non-covered faces, and the second data set includes a plurality of face image samples of at least partially covered faces;

in response to that the first training loss value meets a first loss value threshold value, in a direction from eyes to a forehead, cropping a portion above the eyes from the initial face image frame to serve as a target face image;

determining predicted identity information and a predicted identity value corresponding to the target face image according to the target face image, and determining a second training loss value corresponding to the predicted identity value through a predetermined second loss function; and adjusting network parameters of the convolutional neural network according to the second training loss value till a training crop condition is met so as to acquire a trained convolutional neural network.

In some embodiments, in response to that the first training loss value meets the first loss value threshold value, in the direction from the eyes to the forehead, cropping the portion above the eyes from the initial face image frame to serve as the target face image, includes:

determining feature vectors of a face in the initial face image frame in response to that the first training loss value meets the first loss value threshold value;

correcting the initial face image frame according to a left pupil feature vector and a right pupil feature vector in the feature vectors of the face in the initial face image frame; and in the direction from the eyes to the forehead, cropping the portion above the eyes from the corrected initial face image frame to serve as the target face image.

In some embodiments, the correcting the initial face image frame according to the left pupil feature vector and the right pupil feature vector in the feature vectors of the face in the initial face image frame, includes:

determining a straight line where a left pupil and a right pupil are located in the initial face image frame according to the left pupil feature vector and the right pupil feature vector in the feature vectors of the face in the initial face image frame; and detecting whether the straight line is parallel to upper and lower opposite edges of the initial face image frame or not;

in response to the straight line being parallel to the upper and lower opposite edges, using the initial face image frame directly as the corrected initial face image frame; and otherwise, using an image processing library to rotate the initial face image frame so as to make the straight line parallel to the upper and lower opposite edges to serve as the corrected initial face image frame.

In some embodiments, the determining the predicted identity information and the predicted identity value corresponding o the target face image according to the target face image, and determining the second training loss value corresponding to the predicted identity value through the predetermined second loss function, include:

determining feature vectors of a face in the target face image through a trained ResNet50 network according to the target face image;

determining the predicted identity information and the predicted identity value corresponding to the target face image according to the feature vectors of the face in the target face image and feature vectors of a face corresponding to each pre-stored identity information in an identity information library; and determining the second training loss value through the predetermined second loss function according to the determined predicted identity value corresponding to the target face image.

In some embodiments, the ResNet50 network is trained by:

determining feature vectors of a face in each face image sample in the second training sample set; wherein the second training sample set includes the plurality of face image samples of the non-covered faces;

correcting each face image sample in the second training sample set according to a left pupil feature vector and a right pupil feature vector in the feature vectors of the face in each face image sample in the second training sample set;

in a direction from eyes to a forehead, cropping a portion above the eyes from a corrected face image sample in the second training sample set to serve as a training face image;

inputting the training face image into the ResNet50 network so as to acquire feature vectors of the training face image;

determining predicted identity information and a predicted identity value corresponding to the training face image according to the feature vectors of the training face image and the feature vectors of the face corresponding to each pre-stored identity information in the identity information library;

determining a third training loss value corresponding to the training face image through the predetermined second loss function according to the determined predicted identity value corresponding to the training face image; and adjusting network parameters of the ResNet50 network according to the third training loss value till the training crop condition is met so as to acquire a trained ResNet50 network.

An embodiment of the present disclosure provides a method for face recognition, including:

acquiring a face detection image;

using a convolutional neural network to extract an initial face image frame from the face detection image;

in a direction from eyes to a forehead, cropping a portion above the eyes from the initial face image frame extracted from the face detection image to serve as a target face detection image;

determining predicted identity information corresponding to the target face detection image according to the target face detection image; and comparing the target face detection image with a face reference image corresponding to the predicted identity information for face recognition.

In some embodiments, the convolutional neural network is trained by:

inputting a first training sample set into the convolutional neural network, extracting an initial face image frame in each face image sample in the first training sample set, and determining a first training loss value corresponding to the initial face image frame through a predetermined first loss function; wherein the first training sample set includes a first data set and a second data set; the first data set includes a plurality of face image samples of non-covered faces, and the second data set includes a plurality of face image samples of at least partially covered faces;

in response to that the first training loss value meets a first loss value threshold value, in the direction from eyes to the forehead, cropping a portion above the eyes from the initial face image frame to serve as a target face image;

determining predicted identity information and a predicted identity value corresponding to the target face image according to the target face image, and determining a second training loss value corresponding to the predicted identity value through a predetermined second loss function; and adjusting network parameters of the convolutional neural network according to the second training loss value till a training crop condition is met so as to acquire a trained convolutional neural network.

In some example, the comparing the target face detection image with the face reference image corresponding to the predicted identity information for face recognition, includes:

determining feature vectors of a face in the target face detection image and feature vectors of a face in the face reference image through the trained ResNet50 network according to the target face detection image and the face reference image corresponding to the predicted identity information;

determining similarity according to the feature vectors of the face in the target face detection image and the feature vectors of the face in the face reference image; and in response to that the similarity meets a similarity threshold value, determining that the predicted identity information is identity information of the target face detection image.

In some embodiments, in the direction from the eyes to the forehead, cropping the portion above the eyes from the initial face image frame extracted from the face detection image to serve as the target face detection image, includes:

determining feature vectors of a face in the initial face image frame;

correcting the initial face image frame according to a left pupil feature vector and a right pupil feature vector in the feature vectors of the face in the initial face image frame; and in the direction from the eyes to the forehead, cropping the portion above the eyes from the corrected initial face image frame to serve as the target face detection image.

In some embodiments, the correcting the initial face image frame according to the left pupil feature vector and the right pupil feature vector in the feature vectors of the face in the initial face image frame, includes:

determining a straight line where a left pupil and a right pupil are located in the initial face image frame according to the left pupil feature vector and the right pupil feature vector in the feature vectors of the face in the initial face image frame; and detecting whether the straight line is parallel to upper and lower opposite edges of the initial face image frame or not;

in response to the straight line being parallel to the upper and lower opposite edges, using the initial face image frame directly as the corrected initial face image frame; and otherwise, using the image processing library to rotate the initial face image frame so as to make the straight line parallel to the upper and lower opposite edges to serve as the corrected initial face image frame.

An embodiment of the present disclosure provides a computer non-transient readable storage medium with computer programs stored thereon, wherein when the programs are executed by a processor, the method mentioned above are implemented.

An embodiment of the present disclosure provides a device for face recognition, including a memory, a processor and computer programs which are stored in the memory and may run on the processor, wherein the method mentioned above are implemented when the processor executes the programs.

DETAILED DESCRIPTION OF THE EMBODIMENTS

In order to make objectives, technical solutions and advantages clearer, the technical solutions in embodiments of the present disclosure will be clearly and fully described in combination with the accompanying drawings of the embodiments of the present disclosure. Apparently, the described embodiments are some, but not all of the embodiments of the present disclosure. Besides, under the condition of no conflict, the embodiments and features in the embodiments may be mutually combined. Based on the described embodiments of the present disclosure, all other embodiments acquired by those ordinarily skilled in the art without creative work belong to the protection scope of the present disclosure.

Unless otherwise defined, technical or scientific terms used herein should be understood commonly by those ordinarily skilled in the art of the present disclosure. "First", "second" and similar words used herein do not denote any sequence, quantity or significance, but are only used for distinguishing different components. "Include" or "contain" and similar words mean that elements or items preceding the word cover elements or items and their equivalents listed after the word without excluding other elements or items. "Connection" or "joint" and similar words are not limited to physical or mechanical connection and also include electrical connection in spite of being direct or indirect.

It should be noted that sizes and shapes of all figures in the drawings do not reflect a true scale and only intend to illustrate contents of the present disclosure. Same or similar reference numbers denote same or similar elements or elements with same or similar functions all the time.

Face recognition is an identity recognition technology based on face features of people. With development of deep learning, the accuracy of face recognition becomes higher and higher, for example, face recognition may be used to clock in. Generally, a face recognition method is established on the basis of a complete face for face recognition. However, as a mask covers part of face information, a recognition ratio is low if a face with the mask is recognized on the basis of a common face recognition method.

Generally, in order to better recognize a face image, more and more recognition processes need a convolutional neural network (CNN). In order to guarantee an accurate recognition result, the CNN needs to be trained repeatedly, and thus the trained CNN is used for face recognition.

Figure 1:
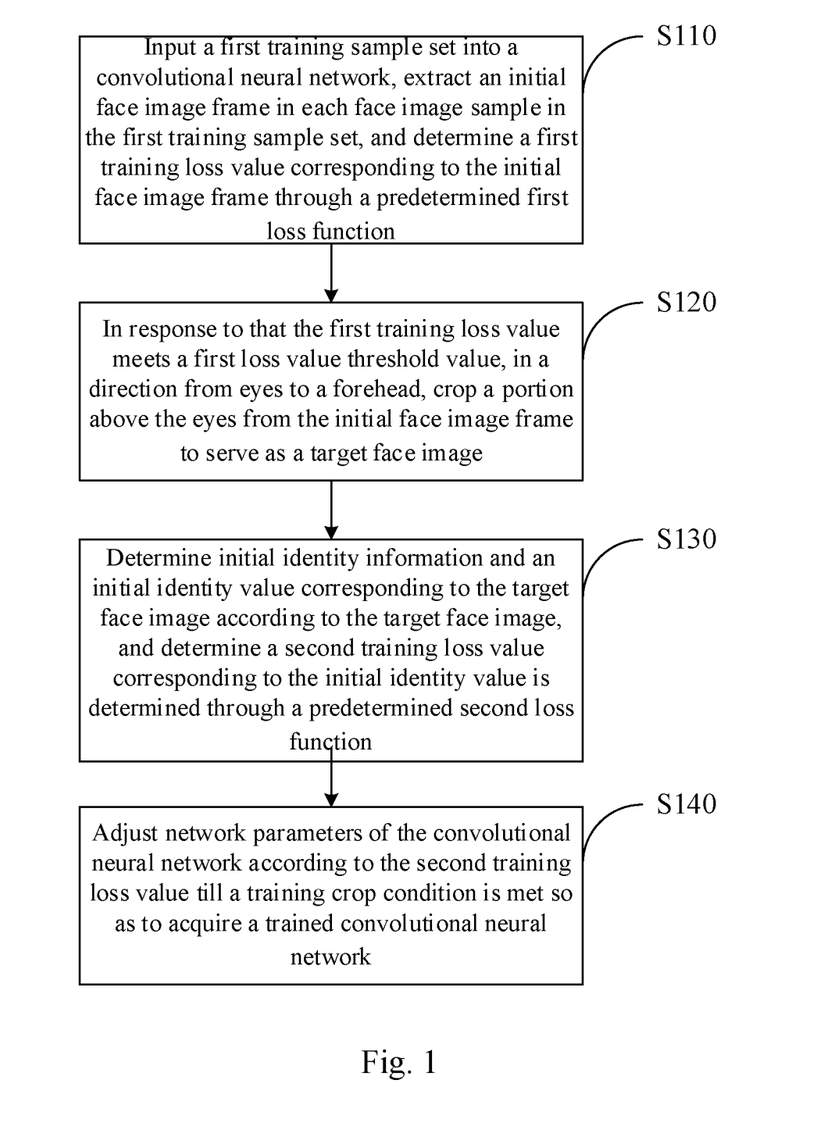
FIG. 1 is a flowchart of some training methods in an embodiment of the present disclosure.

An embodiment of the present disclosure provides a training method of a convolutional neural network, as shown in FIG. 1, including the following steps:

S110, a first training sample set is input into the convolutional neural network, an initial face image frame in each face image sample in the first training sample set is extracted, and a first training loss value corresponding to the initial face image frame is determined through a predetermined first loss function; wherein the first training sample set includes a first data set and a second data set, the first data set includes a plurality of face image samples of non-covered faces, the second data set includes a plurality of face image samples of at least partially covered faces, and at least part of faces in the face image samples of the covered faces are covered by masks;

S120, in response to that the first training loss value meets a first loss value threshold value, in a direction from eyes to a forehead, a portion above the eyes is cropped from the initial face image frame to serve as a target face image;

S130, predicted identity information and a predicted identity value corresponding to the target face image are determined according to the target face image, and a second training loss value corresponding to the predicted identity value is determined through a predetermined second loss function; and S140, network parameters of the convolutional neural network according to the second training loss value are adjusted till a training crop condition is met so as to acquire a trained convolutional neural network.

According to the training method of the convolutional neural network provided by the embodiment of the present disclosure, by arranging the first training sample set including the first data set and the second data set, the first data set includes the plurality of face image samples of non-covered faces, the second data set includes the plurality of face image samples of at least partially covered faces, and at least part of faces in the face image samples of the covered faces are covered by the masks, thus after the first training sample set is input into the convolutional neural network, the initial face image frame in each face image sample in the first training sample set is extracted, and the first training loss value corresponding to the initial face image frame is determined through the predetermined first loss function. The first training sample set includes the face images covered by the masks, portions below noses are covered by the masks, thus when the first training loss value meets the first loss value threshold value, in the direction from the eyes to the forehead, the portion above the eyes is cropped from the initial face image frame to serve as the target face image. Therefore, by inputting the sample set with the face image samples not covered by the masks and the face image samples covered by the masks into the convolutional neural network, the convolutional neural network is trained, the portion above the eyes is cropped from the initial face image frame in a training process to serve as the target face image, and the target face image with portions like the eyes, eyebrows, the forehead, etc. may be reserved. Then according to the target face image, the predicted identity information and the predicted identity value corresponding to the target face image are determined, and the second training loss value corresponding to the predicted identity value is determined through the predetermined second loss function. Then according to the second training loss value, the network parameters of the convolutional neural network are adjusted till the training crop condition is met, the trained convolutional neural network is acquired, and thus training of the convolutional neural network is achieved.

In some embodiments, the plurality of face image samples of non-covered faces included in the first data set may be set as normal face images without the masks. Exemplarily, the first data set may be a Wider Face data set. It should be noted that the Wider Face data set may be basically the same as that of the prior art, which is not described in detail herein.

In some embodiments, the plurality of face image samples of at least partially covered faces included in the second data set may be set as face images of masked faces or face images of faces covered by other objects. Exemplarily, the second data set may be a (Masked Faces) MAFA data set. It should be noted that the MAFA data set may be basically the same as that of the prior art, which is not described in detail herein.

In some embodiments, the first loss function may be a cross entropy loss function or a comparison loss function, which is not limited herein.

In some embodiments, the second loss function may be a cross entropy loss function or a comparison loss function, which is not limited herein.

Figure 2:
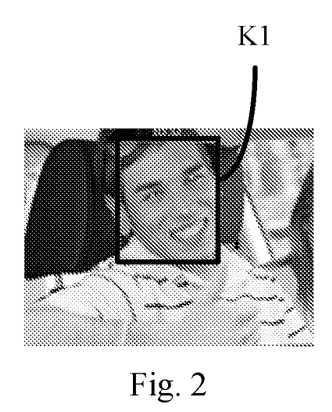
FIG. 2 is a schematic diagram of some faces in an embodiment of the present disclosure.
Figure 3:
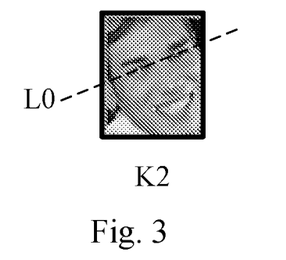
FIG. 3 is a schematic diagram of an initial face image frame in an embodiment of the present disclosure.

In some embodiments, as shown in FIG. 2 and FIG. 3, through the convolutional neural network, the initial face image frame K1 may be marked in an image shown in FIG. 2 and is extracted so as to form initial face image frame K2 shown in FIG. 3.

In some embodiments, when the first training loss value meets the first loss value threshold value, in the direction from the eyes to the forehead, the portion above the eyes is cropped from the initial face image frame to serve as the target face image, including:

when the first training loss value meets the first loss value threshold value, feature vectors of a face in the initial face image frame are determined;

the initial face image frame is corrected according to a left pupil feature vector and a right pupil feature vector in the feature vectors of the face in the initial face image frame; and in the direction from the eyes to the forehead, the portion above the eyes is cropped from a corrected initial face image frame to serve as the target face image.

Exemplarily, the eyes, eyebrows, foreheads and the like in the face images of masked faces and the face images without the masks are not covered by the masks, the initial face image frame may be corrected through the left pupil feature vector and the right pupil feature vector in the eyes, and then the portion above the eyes is cropped from the corrected initial face image frame to serve as the target face image.

Exemplarily, the initial face image frame is corrected according to the left pupil feature vector and the right pupil feature vector in the feature vectors of the face in the initial face image frame, including:

a straight line where a left pupil and a right pupil in the initial face image frame are located is determined according to the left pupil feature vector and the right pupil feature vector in the feature vectors of the face in the initial face image frame; and whether the straight line is parallel to upper and lower opposite edges of the initial face image frame or not is detected;

if yes, the initial face image frame is directly used as the corrected initial face image frame; and otherwise, an image processing library is used to rotate the initial face image frame so as to make the straight line parallel to the upper and lower opposite edges to serve as the corrected initial face image frame.

Figure 4:
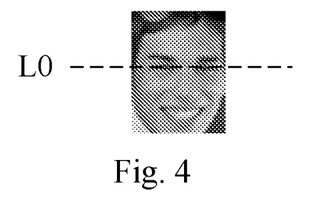
FIG. 4 is a schematic diagram of an image after an initial face image frame is corrected in an embodiment of the present disclosure.

Exemplarily, the face in the initial face image frame may be corrected through the feature vectors of the left pupil and the right pupil in the eyes. In combination with FIG. 3 and FIG. 4, the straight line L0 where the left pupil and the right pupil in the initial face image frame are located may be determined through the feature vectors of the left pupil and the right pupil in the eyes in the initial face image frame. Whether the straight line L0 is parallel to the upper and lower opposite edges of the initial face image frame or not is detected, when the straight line L0 is parallel to the upper and lower opposite edges of the initial face image frame, the initial face image frame may be directly used as the corrected initial face image frame, and when the straight line L0 is not parallel to the upper and lower opposite edges of the initial face image frame, the image processing library may be used to rotate the initial face image frame so as to make the straight line parallel to the upper and lower opposite edges, and a rotated initial face image frame is used as the corrected initial face image frame. For example, as shown in FIG. 3 and FIG. 4, the straight line L0 which is not parallel to the upper and lower opposite edges of the initial face image frame originally is rotated to be parallel to the upper and lower opposite edges of the initial face image frame in a rotating mode.

Exemplarily, the image processing library may be, e.g., OpenCV. Certainly, the image processing library may be further arranged in other manners in the prior art, which is not limited herein.

In some embodiments, the predicted identity information and the predicted identity value corresponding to the target face image are determined according to the target face image, and the second training loss value corresponding to the predicted identity value is determined through the predetermined second loss function, including:

feature vectors of a face in the target face image are determined through a trained ResNet50 network according to the target face image;

the predicted identity information and the predicted identity value corresponding to the target face image are determined according to the feature vectors of the face in the target face image and feature vectors of a face corresponding to each pre-stored identity information in an identity information library; and the second training loss value is determined through the predetermined second loss function according to the determined predicted identity value corresponding to the target face image.

Figure 6:
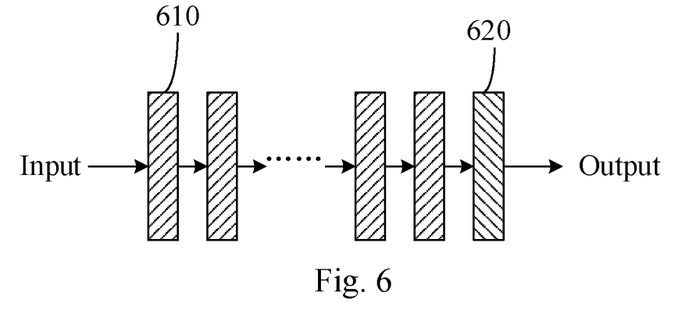
FIG. 6 is a schematic structural diagram of a ResNet50 network in an embodiment of the present disclosure.

Exemplarily, a structure of the ResNet50 network is shown in FIG. 6 and may include a plurality of residual error units 610 and a full connection layer 620. The face images may be input into the first residual error unit 610, feature calculation is performed through these residual error units 610, and finally, the feature vectors are generated through full connection by the full connection layer 620 and are output. Exemplarily, the feature vectors of the face in the target face image determined by the trained ResNet50 network may be feature vectors in a 512 dimension. Thus, a storage space of the face feature vectors may be reduced, and the calculation speed of feature matching may be increased. Certainly, during actual application, a specific dimension of the feature vectors may be determined according to demands of actual application, which is not limited herein.

Figure 7:
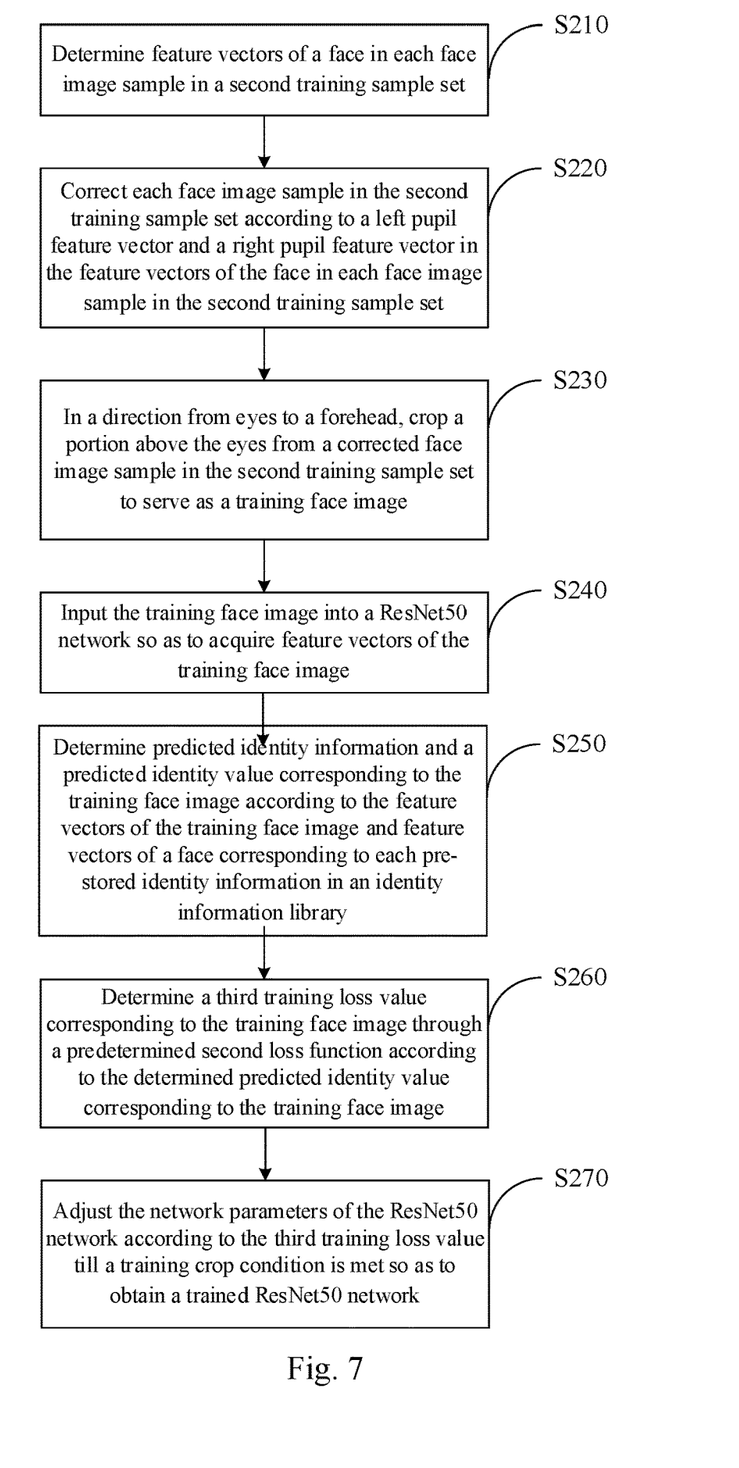
FIG. 7 is a flowchart of some other training methods in an embodiment of the present disclosure.

Exemplarily, as shown in FIG. 7, a training method of the ResNet50 network may include the following steps:

S210, the feature vectors of the face in each face image sample in the second training sample set are determined; wherein the second training sample set includes the plurality of face image samples of the non-covered faces, and exemplarily, the second training sample set may be a MS-Celeb-1M data set. For example, the feature vectors of the face in each face image sample in the second training sample set are determined through a method in the prior art;

S220, each face image sample in the second training sample set is corrected according to the left pupil feature vector and the right pupil feature vector in the feature vectors of the face in each face image sample in the second training sample set. Exemplarily, whether the left pupil and the right pupil in the same face image sample are located on the same horizontal line or not is judged according to the left pupil feature vector and the right pupil feature vector in the feature vectors of the face in each face image sample in the second training sample set, wherein the horizontal line is parallel to an upper edge or a lower edge of the initial face image frame; and if not, the left pupil and the right pupil in the same face image sample are rotated onto the horizontal line through the image processing library;

S230, in the direction from the eyes to the forehead, the portion above the eyes is cropped from the corrected face image sample in the second training sample set to serve as the training face image. The specific process of the step may refer to a working process of S120: in a direction from eyes to a forehead, a portion above the eyes is cropped from the initial face image frame to serve as a target face image, which is not limited herein;

S240, the training face image is input into the ResNet50 network so as to acquire feature vectors of the training face image; exemplarily, the structure of the ResNet50 network is shown in FIG. 6;

S250, the predicted identity information and the predicted identity value corresponding to the training face image are determined according to the feature vectors of the training face image and the feature vectors of the face corresponding to each pre-stored identity information in the identity information library;

S260, a third training loss value corresponding to the training face image is determined through the predetermined second loss function according to the determined predicted identity value corresponding to the training face image;

S270, the network parameters of the ResNet50 network are adjusted according to the third training loss value till the training crop condition is met so as to obtain the trained ResNet50 network.

The present disclosure will be descried in detail below in combination with some embodiments. It should be noted that the embodiments are used for better illustrating the present disclosure, but not limit the present disclosure.

The training method of the convolutional neural network provided by some embodiments of the present disclosure, may include the following steps.

(1) the first training sample set is composed of the Wider Face data set and the MAFA data set and is input into a to-be-trained convolutional neural network so as to extract the initial face image frame in each face image sample in the first training sample set, and the first training loss value corresponding to the initial face image frame is determined through the predetermined first loss function.

Exemplarily, as for each face image sample, the face feature vectors of five different scales in the face image sample may be acquired through the to-be-trained convolutional neural network, then target retrieving and positioning may be performed according to the face feature vectors of the five different scales in the face image sample, and the initial face image frame where a face in the face image sample is located is determined. The initial face image frame means a square region formed by the face after the face is cut out from the face image sample. For example, as shown in FIG. 2 and FIG. 3, the initial face image frame K1 may be marked in the image shown in FIG. 2 through the convolutional neural network, and initial face image frame K1 is extracted so as to form initial face image frame K2 shown in FIG. 3.

Besides, the first training loss value corresponding to the initial face image frame may be determined through the first loss function.

It should be noted that a scale needed by the face image samples to be input into the to-be-trained convolutional neural network is set to be a 640*640 pixel size. When a size of the face image samples in the first training sample set is different from the scale needed by the face image samples to be input into the to-be-trained convolutional neural network, the size of the face image samples in the first training sample set may be changed, so that the changed size of the face image samples in the first training sample set may be a 640*640 pixel size. Therefore, the size of the face image samples in the first training sample set may meet the requirement of inputting into the to-be-trained convolutional neural network.

(2) As for each initial face image frame, when the first training loss value meets the first loss value threshold value, it means that the initial face image frame meets the requirement, and thus the feature vectors of the face in the initial face image frame are determined.

It needs to be noted that the first loss value threshold value may be designed and determined according to the demands of actual application, which is not limited herein.

(3) As for the feature vectors of the face in each initial face image frame, the straight line where the left pupil and the right pupil in the initial face image frame are located is determined according to the left pupil feature vector and the right pupil feature vector in the feature vectors of the face in the initial face image frame.

Exemplarily, as shown in FIG. 3, the straight line L0 where the left pupil and the right pupil in the initial face image frame are located may be determined through the feature vectors of the left pupil and the right pupil in the eyes in the initial face image frame. The straight line L0 where the left pupil and the right pupil are located shown in FIG. 3 is not parallel to the upper and lower opposite edges of the initial face image frame.

(4) Whether the straight line L0 is parallel to the upper and lower opposite edges of the initial face image frame or not is detected. If yes, step (5) is performed; and otherwise, step (6) is performed.

(5) The initial face image frame is directly used as the corrected initial face image frame.

(6) The image processing library (e.g., OpenCV) is used to rotate the initial face image frame so as to make the straight line parallel to the upper and lower opposite edges, and the rotated initial face image frame is used as the corrected initial face image frame.

For example, as shown in FIG. 3 and FIG. 4, the straight line L0 which is not parallel to the upper and lower opposite edges of the initial face image frame originally is rotated to be parallel to the upper and lower opposite edges of the initial face image frame in a rotating mode.

Figure 5:
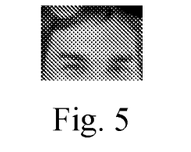
FIG. 5 is a schematic diagram of an image after an initial face image frame is cropped in an embodiment of the present disclosure.

(7) As shown in FIG. 4 and FIG. 5, in the direction from the eyes to the forehead, the portion above the eyes is cropped from the corrected initial face image frame to serve as the target face image. Exemplarily, the target face image may include regions with the eyes, eyebrows, the forehead, etc.

(8) The target face image is input into the trained ResNet50 network so as to determine the feature vectors of the face in the target face image.

Exemplarily, in combination with FIG. 6, the target face image is input into the trained ResNet50 network, feature calculation is performed in sequence through the residual error units 610, and finally, the feature vectors in the dimension 512 of the face in the target face image are generated through full connection by the full connection layer 620.

(9) As for each target face image, predicted identity information and the predicted identity value corresponding to the target face image are determined according to the feature vectors of the face in the target face image and the feature vectors of the face corresponding to each pre-stored identity information in the identity information library.

Exemplarily, the feature vectors of the face in the target face image may be compared with the feature vectors of the face corresponding to each pre-stored identity information in the identity information library, so that identity information corresponding to the target face image is predicted, and then the predicted identity information corresponding to the target face image is obtained. Besides, when the identity information corresponding to the target face image is predicted, the predicted identity value corresponding to the predicted identity information may be further determined.

It needs to be noted that identity information (e.g., ID) of a plurality of persons and the face feature vectors corresponding to each of the persons are acquired in advance so as to form the identity information library, and the identity information library is stored.

(10) The second training loss value is determined through the predetermined second loss function according to the determined predicted identity value corresponding to the target face image.

(11) The network parameters of the convolutional neural network are adjusted according to the second training loss value.

Step (1) to step (11) are repeated till the training crop condition is met, and then the trained convolutional neural network is obtained.

Figure 8:
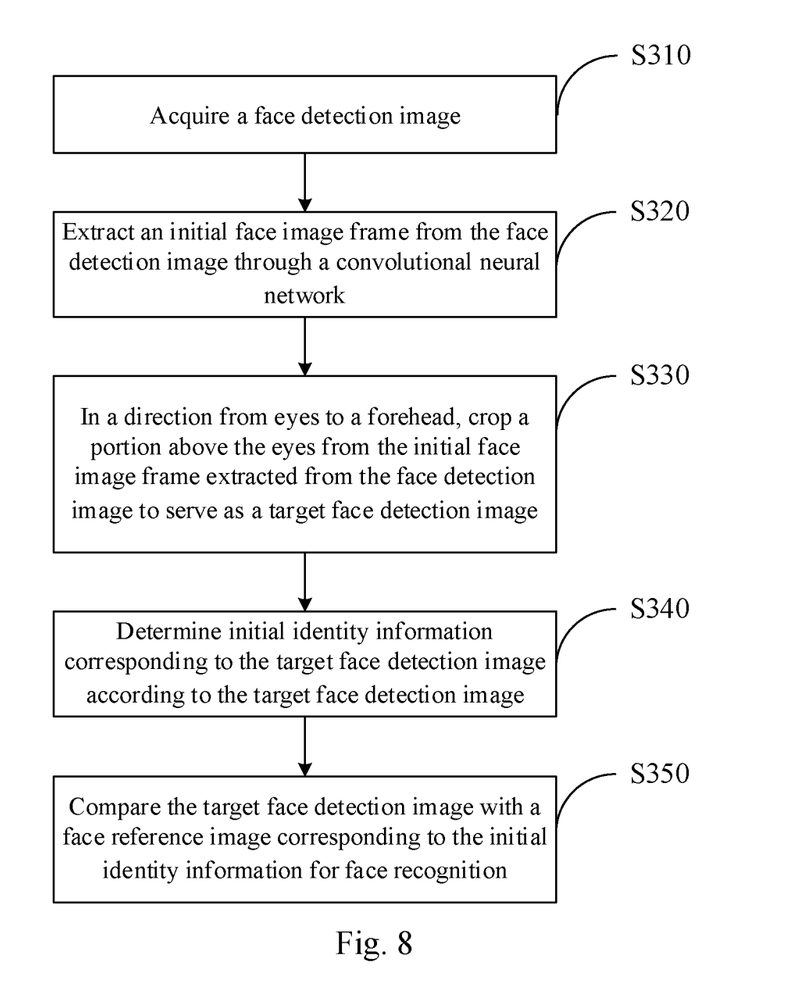
FIG. 8 is a flowchart of some face recognition methods in an embodiment of the present disclosure.

An embodiment of the present disclosure further provides a face recognition method, as shown in FIG. 8, including the following steps:

S310, a face detection image is acquired;

S320, an initial face image frame is extracted from the face detection image through a convolutional neural network; wherein the convolutional neural network is obtained by training through the above-mentioned training method;

S330, in a direction from eyes to a forehead, a portion above the eyes is cropped from the initial face image frame extracted from the face detection image to serve as a target face detection image;

S340, predicted identity information corresponding to the target face detection image is determined according to the target face detection image; and S350, the target face detection image is compared with a face reference image corresponding to the predicted identity information for face recognition.

According to the face recognition method provided by some embodiments of the present disclosure, the trained convolutional neural network is applied to the face recognition method, the initial face image frame may be extracted from the face detection image, then the portion above the eyes is cropped from the initial face image frame to serve as the target face detection image, and thus the predicted identity information corresponding to the target face detection image is determined according to the target face detection image. Then the target face detection image is compared with the face reference image corresponding to the predicted identity information for face recognition. Therefore, the face recognition method provided by the present disclosure may be used to clock in, or be applied to traffic detection.

In some embodiments, the target face detection image is compared with the face reference image corresponding to the predicted identity information for face recognition, including:

feature vectors of a face in the target face detection image and feature vectors of a face in the face reference image are determined through the trained ResNet50 network according to the target face detection image and the face reference image corresponding to the predicted identity information;

similarity is determined according to the feature vectors of the face in the target face detection image and the feature vectors of the face in the face reference image; and when the similarity meets a similarity threshold value, the predicted identity information is determined to be identity information of the target face detection image.

In some embodiments, during specific implementation, in the direction from the eyes to the forehead, the portion above the eyes is cropped from the initial face image frame extracted from the face detection image to serve as the target face detection image, including:

feature vectors of a face in the initial face image frame are determined;

the initial face image frame is corrected according to a left pupil feature vector and a right pupil feature vector in the feature vectors of the face in the initial face image frame; and in the direction from the eyes to the forehead, the portion above the eyes is cropped from the corrected initial face image frame to serve as the target face detection image.

In some embodiments, the initial face image frame is corrected according to the left pupil feature vector and the right pupil feature vector in the feature vectors of the face in the initial face image frame, including:

a straight line where a left pupil and a right pupil in the initial face image frame are located is determined according to the left pupil feature vector and the right pupil feature vector in the feature vectors of the face in the initial face image frame; and whether the straight line is parallel to upper and lower opposite edges of the initial face image frame or not is detected;

if yes, the initial face image frame is directly used as the corrected initial face image frame; and otherwise, an image processing library is used to rotate the initial face image frame so as to make the straight line parallel to the upper and lower opposite edges to serve as the corrected initial face image frame.

The present disclosure will be described below in detail in combined with some embodiments. It needs to be noted that embodiments are used for better illustrating the present disclosure, but not limit the present disclosure.

The method for face recognition provided by some embodiment of the present disclosure may include the following steps.

(1) The face detection image is acquired. Exemplarily, the face detection image is captured through a camera or obtained through an image transmission device, which may be designed according to demands of actual application certainly during actual application and will not be limited herein.

Exemplarily, the face detection image may be captured through the camera when a user clocks in. Or the face detection image may be one or more images determined from video streaming.

(2) After the size of the face detection image is adjusted to be a size needed by the trained convolutional neural network, the face detection image is input into the trained convolutional neural network, so that the initial face image frame may be extracted from the face detection image. The initial face image frame means a square region formed by the face after the face is cut out from the face detection image, e.g., initial face image frame K2 shown in FIG. 3.

(3) The feature vectors of the face in the initial face image frame are determined.

(4) As for the feature vectors of the face in each initial face image frame, the straight line where the left pupil and the right pupil in the initial face image frame are located is determined according to the left pupil feature vector and the right pupil feather vector in the feature vectors of the face in the initial face image frame.

Exemplarily, as shown in FIG. 3, the straight line L0 where the left pupil and the right pupil in the initial face image frame are located may be determined through the feature vectors of the left pupil and the right pupil in the eyes in the initial face image frame. The straight line L0 where the left pupil and the right pupil are located shown in FIG. 3 is not parallel to the upper and lower opposite edges of the initial face image frame.

(5) Whether the straight line L0 is parallel to the upper and lower opposite edges of the initial face image frame or not is detected. If yes, step (6) is performed; and otherwise, step (7) is performed.

(6) The initial face image frame is directly used as the corrected initial face image frame.

(7) The image processing library (e.g., OpenCV) is used to rotate the initial face image frame so as to make the straight line parallel to the upper and lower opposite edges, and the rotated initial face image frame is used as the corrected initial face image frame.

For example, as shown in FIG. 3 and FIG. 4, the straight line L0 which is not parallel to the upper and lower opposite edges of the initial face image frame originally is rotated to be parallel to the upper and lower opposite edges of the initial face image frame in a rotating mode.

(8) As shown in FIG. 4 and FIG. 5, in the direction from the eyes to the forehead, the portion above the eyes is cropped from the corrected initial face image frame to serve as the target face detection image. Exemplarily, the target face detection image may include regions with the eyes, eyebrows, the forehead, etc.

(9) The target face detection image is input into the trained ResNet50 network so as to determine the feature vectors of the face in the target face image.

Exemplarily, as shown in FIG. 6, the target face detection image is input into the trained ResNet50 network, feature calculation is performed in sequence through residual error units 610, and finally, the feature vectors in the dimension 512 of the face in the target face detection image are generated through full connection by the full connection layer 620.

(10) The predicted identity information corresponding to the target face detection image is determined according to the feature vectors of the face in the target face detection image and the feature vectors of the face corresponding to each pre-stored identity information in the identity information library.

(11) The feature vectors of the face in the target face detection image and the feature vectors of the face in the face reference image are determined through the trained ResNet50 network according to the target face detection image and the face reference image corresponding to the predicted identity information.

Exemplarily, as shown in FIG. 6, the target face detection image and the face reference image are input into the trained ResNet50 network, feature calculation is performed in sequence through the residual error units 610, and finally, the feature vectors in the dimension 512 of the face in the target face detection image and the feature vectors in the dimension 512 of the face in the face reference image are generated through full connection by the full connection layer 620.

(12) The similarity is determined according to the feature vectors of the face in the target face detection image and the feature vectors of the face in the face reference image.

Exemplarily, a cosine distance is determined according to the feature vectors of the face in the target face detection image and the feature vectors of the face in the face reference image. Then the similarity is determined according to the cosine distance.

(13) When the similarity meets a similarity threshold value, the predicted identity information is determined to be identity information of the target face detection image, and thus face recognition is completed. If the method is used to clock in, it may be believed that an ID of the face detection image is recognized, and thus clocking in is completed.

Exemplarily, the similarity threshold value may be a value in a range of [−1.0, 1.0]. When the similarity is larger than the similarity threshold value, it may be affirmed that a person in the target face detection image and a person in the face reference image are the same one.

Figure 9:
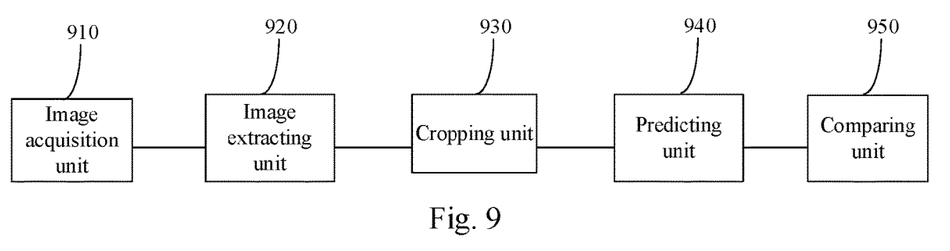
FIG. 9 is a schematic structural diagram of some face recognition devices in an embodiment of the present disclosure.

An embodiment of the present disclosure further provides a device for face recognition, as shown in FIG. 9, including:

an image acquisition unit 910, configured to acquire a face detection image. Exemplarily, the image acquisition unit may be a camera or an image transmission device. Therefore, the face detection image may be acquired through the camera or the image transmission device, which may be designed according to demands of actual application certainly during actual application and will not be limited herein.

an image frame extracting unit 920, configured to extract an initial face image frame from the face detection image through a convolutional neural network;

a cropping unit 930, configured to, in a direction from eyes to a forehead, crop a portion above the eyes from the initial face image frame extracted from the face detection image to serve as a target face detection image;

a predicting unit 940, configured to determine predicted identity information corresponding to the target face detection image according to the target face detection image; and a comparing unit 950, configured to compare the target face detection image with a face reference image corresponding to the predicted identity information for face recognition.

Exemplarily, the image frame extracting unit, the cropping unit, the predicting unit and the comparing unit in embodiments of the present disclosure may be in a manner of embodiments of complete hardware or complete software or hardware and software combination.

On the basis of the same inventive concept, an embodiment of the present disclosure further provides a computer non-transient readable storage medium with computer programs stored thereon, and when the computer programs are executed by a processor, steps of any one method for face recognition provided by embodiments of the present disclosure are implemented. Optionally, the present disclosure may adopt a manner of a computer program product implemented on one or more computer applicable storage media (including but not limited to a disk memory, an optical memory, etc.) including computer applicable program codes.

On the basis of the same inventive concept, an embodiment of the present disclosure further provides computer equipment, including a memory, a processor and computer programs which are stored in the memory and may run on the processor, and when the processor executes the computer programs, steps of any one method for face recognition provided by embodiments of the present disclosure are implemented.

Apparently, those skilled in the art may make various changes and transformations for the present disclosure without departing from the spirit and scope of the present disclosure. In this case, if these changes and transformations of the present disclosure belong to the scope of claims and their equivalents, the present disclosure also intends to include these changes and transformations.

What is claimed is:

1. A method for training a convolutional neural network, comprising:

inputting a first training sample set into the convolutional neural network, extracting an initial face image frame in each face image sample in the first training sample set, and determining a first training loss value corresponding to the initial face image frame through a predetermined first loss function; wherein the first training sample set comprises a first data set and a second data set, the first data set comprises a plurality of face image samples of non-covered faces, and the second data set comprises a plurality of face image samples of at least partially covered faces;

in response to that the first training loss value meets a first loss value threshold value, in a direction from eyes to a forehead, cropping a portion above the eyes from the initial face image frame to serve as a target face image;

determining predicted identity information and a predicted identity value corresponding to the target face image according to the target face image, and determining a second training loss value corresponding to the predicted identity value through a predetermined second loss function; and adjusting network parameters of the convolutional neural network according to the second training loss value till a training crop condition is met so as to obtain a trained convolutional neural network.

2. The method according to claim 1, wherein in response to that the first training loss value meets the first loss value threshold value, in the direction from the eyes to the forehead, cropping the portion above the eyes from the initial face image frame to serve as the target face image, comprises:

determining feature vectors of a face in the initial face image frame in response to that the first training loss value meets the first loss value threshold value;

correcting the initial face image frame according to a left pupil feature vector and a right pupil feature vector in the feature vectors of the face in the initial face image frame; and in the direction from the eyes to the forehead, cropping the portion above the eyes from corrected initial face image frame to serve as the target face image.

3. The method according to claim 2, wherein the correcting the initial face image frame according to the left pupil feature vector and the right pupil feature vector in the feature vectors of the face in the initial face image frame, comprises:

determining a straight line where a left pupil and a right pupil are located in the initial face image frame according to the left pupil feature vector and the right pupil feature vector in the feature vectors of the face in the initial face image frame; and detecting whether the straight line is parallel to upper and lower opposite edges of the initial face image frame or not;

using the initial face image frame directly as the corrected initial face image frame in response to the straight line being parallel to the upper and lower opposite edges; and otherwise, using an image processing library to rotate the initial face image frame so as to make the straight line parallel to the upper and lower opposite edges to serve as the corrected initial face image frame.

4. The method according to claim 1, wherein the determining the predicted identity information and the predicted identity value corresponding o the target face image according to the target face image, and determining the second training loss value corresponding to the predicted identity value through the predetermined second loss function, comprise:

determining feature vectors of a face in the target face image through a trained ResNet50 network according to the target face image;

determining the predicted identity information and the predicted identity value corresponding to the target face image according to the feature vectors of the face in the target face image and feature vectors of a face corresponding to each pre-stored identity information in an identity information library; and determining the second training loss value through the predetermined second loss function according to determined predicted identity value corresponding to the target face image.

5. The method according to claim 4, wherein the ResNet50 network is trained by:

determining feature vectors of a face in each face image sample in the second training sample set; wherein the second training sample set comprises the plurality of face image samples of the non-covered faces;

correcting each face image sample in the second training sample set according to a left pupil feature vector and a right pupil feature vector in the feature vectors of the face in each face image sample in the second training sample set;

in a direction from eyes to a forehead, cropping a portion above the eyes from a corrected face image sample in the second training sample set to serve as a training face image;

inputting the training face image into the ResNet50 network so as to acquire feature vectors of the training face image;

determining predicted identity information and a predicted identity value corresponding to the training face image according to the feature vectors of the training face image and the feature vectors of the face corresponding to each pre-stored identity information in the identity information library;

determining a third training loss value corresponding to the training face image through the predetermined second loss function according to the determined predicted identity value corresponding to the training face image; and adjusting network parameters of the ResNet50 network according to the third training loss value till the training crop condition is met so as to acquire the trained ResNet50 network.

6. A method for face recognition, comprising:

acquiring a face detection image;

using a convolutional neural network to extract an initial face image frame from the face detection image;

in a direction from eyes to a forehead, cropping a portion above the eyes from the initial face image frame extracted from the face detection image to serve as a target face detection image;

determining predicted identity information corresponding to the target face detection image according to the target face detection image; and comparing the target face detection image with a face reference image corresponding to the predicted identity information for face recognition;

wherein the convolutional neural network is trained by:

inputting a first training sample set into the convolutional neural network, extracting an initial face image frame in each face image sample in the first training sample set, and determining a first training loss value corresponding to the initial face image frame through a predetermined first loss function; wherein the first training sample set comprises a first data set and a second data set; the first data set comprises a plurality of face image samples of non-covered faces, and the second data set comprises a plurality of face image samples of at least partially covered faces;

in response to that the first training loss value meets a first loss value threshold value, in the direction from the eyes to the forehead, cropping a portion above the eyes from the initial face image frame to serve as a target face image;

determining predicted identity information and a predicted identity value corresponding to the target face image according to the target face image, and determining a second training loss value corresponding to the predicted identity value through a predetermined second loss function; and adjusting network parameters of the convolutional neural network according to the second training loss value till a training crop condition is met so as to obtain the trained convolutional neural network.

7. The method according to claim 6, wherein the comparing the target face detection image with the face reference image corresponding to the predicted identity information for face recognition, comprises:

determining feature vectors of a face in the target face detection image and feature vectors of a face in the face reference image through a trained ResNet50 network according to the target face detection image and the face reference image corresponding to the predicted identity information;

determining similarity according to the feature vectors of the face in the target face detection image and the feature vectors of the face in the face reference image; and in response to that the similarity meets a similarity threshold value, determining that the predicted identity information is identity information of the target face detection image.

8. The method according to claim 6, wherein in the direction from the eyes to the forehead, cropping the portion above the eyes from the initial face image frame extracted from the face detection image to serve as the target face detection image, comprises:

determining feature vectors of a face in the initial face image frame;

correcting the initial face image frame according to a left pupil feature vector and a right pupil feature vector in the feature vectors of the face in the initial face image frame; and in the direction from the eyes to the forehead, cropping the portion above the eyes from a corrected initial face image frame to serve as the target face detection image.

9. The method according to claim 8, wherein the correcting the initial face image frame according to the left pupil feature vector and the right pupil feature vector in the feature vectors of the face in the initial face image frame, comprises:

determining a straight line where a left pupil and a right pupil are located in the initial face image frame according to the left pupil feature vector and the right pupil feature vector in the feature vectors of the face in the initial face image frame; and detecting whether the straight line is parallel to upper and lower opposite edges of the initial face image frame or not;

in response to the straight line being parallel to the upper and lower opposite edges, using the initial face image frame directly as the corrected initial face image frame; and otherwise, using an image processing library to rotate the initial face image frame so as to make the straight line parallel to the upper and lower opposite edges to serve as the corrected initial face image frame.

10. A computer non-transient readable storage medium with computer programs stored thereon, wherein when the programs are executed by a processor, the method according to claim 6 are implemented.

11. A device for face recognition, comprising a memory, a processor and computer programs which are stored in the memory and executed by the processor, wherein the processor is configured to execute the programs to perform followings:

acquiring a face detection image;

using a convolutional neural network to extract an initial face image frame from the face detection image;

in a direction from eyes to a forehead, cropping a portion above the eyes from the initial face image frame extracted from the face detection image to serve as a target face detection image;

determining predicted identity information corresponding to the target face detection image according to the target face detection image; and comparing the target face detection image with a face reference image corresponding to the predicted identity information for face recognition;

wherein the processor is configured to execute the programs to train the convolutional neural network by:

inputting a first training sample set into the convolutional neural network, extracting an initial face image frame in each face image sample in the first training sample set, and determining a first training loss value corresponding to the initial face image frame through a predetermined first loss function; wherein the first training sample set comprises a first data set and a second data set; the first data set comprises a plurality of face image samples of non-covered faces, and the second data set comprises a plurality of face image samples of at least partially covered faces;

in response to that the first training loss value meets a first loss value threshold value, in the direction from the eyes to the forehead, cropping a portion above the eyes from the initial face image frame to serve as a target face image;

determining predicted identity information and a predicted identity value corresponding to the target face image according to the target face image, and determining a second training loss value corresponding to the predicted identity value through a predetermined second loss function; and adjusting network parameters of the convolutional neural network according to the second training loss value till a training crop condition is met so as to obtain the trained convolutional neural network.

12. The device according to claim 11, wherein the processor is configured to execute the programs to recognizing face by:

determining feature vectors of a face in the target face detection image and feature vectors of a face in the face reference image through a trained ResNet50 network according to the target face detection image and the face reference image corresponding to the predicted identity information;

determining similarity according to the feature vectors of the face in the target face detection image and the feature vectors of the face in the face reference image; and in response to that the similarity meets a similarity threshold value, determining that the predicted identity information is identity information of the target face detection image.

13. The device according to claim 11, wherein the processor is configured to execute the programs to crop the portion above the eyes from the initial face image frame extracted from the face detection image to serve as the target face detection image, by:

determining feature vectors of a face in the initial face image frame;

correcting the initial face image frame according to a left pupil feature vector and a right pupil feature vector in the feature vectors of the face in the initial face image frame; and in the direction from the eyes to the forehead, cropping the portion above the eyes from a corrected initial face image frame to serve as the target face detection image.

14. The device according to claim 13, wherein the processor is configured to execute the programs to correct the initial face image frame, by:

determining a straight line where a left pupil and a right pupil are located in the initial face image frame according to the left pupil feature vector and the right pupil feature vector in the feature vectors of the face in the initial face image frame; and detecting whether the straight line is parallel to upper and lower opposite edges of the initial face image frame or not;

in response to the straight line being parallel to the upper and lower opposite edges, using the initial face image frame directly as the corrected initial face image frame; and otherwise, using an image processing library to rotate the initial face image frame so as to make the straight line parallel to the upper and lower opposite edges to serve as the corrected initial face image frame.

* * * * *